United States Patent
Gerber et al.

(10) Patent No.: US 9,429,968 B2
(45) Date of Patent: Aug. 30, 2016

(54) POWER-GATED ELECTRONIC DEVICE

(75) Inventors: Johannes Gerber, Unterschleissheim (DE); Frank Dornseifer, Freising (DE)

(73) Assignee: TEXAS INSTRUMENTS DEUTSCHLAND GMBH, Freising (DE)

( * ) Notice: Subject to any disclaimer, the term of this patent is extended or adjusted under 35 U.S.C. 154(b) by 1111 days.

(21) Appl. No.: 13/446,378

(22) Filed: Apr. 13, 2012

(65) Prior Publication Data

US 2013/0271103 A1 Oct. 17, 2013

(51) Int. Cl.
*H02J 9/00* (2006.01)
*G05F 1/56* (2006.01)
*G06F 1/26* (2006.01)

(52) U.S. Cl.
CPC . *G05F 1/56* (2013.01); *G06F 1/26* (2013.01); *G06F 1/263* (2013.01)

(58) Field of Classification Search
USPC .......................................................... 307/64
See application file for complete search history.

(56) References Cited

U.S. PATENT DOCUMENTS

| 6,763,471 | B1 | 7/2004 | Aoyama |
| 2003/0011247 | A1 | 1/2003 | Kajiwara et al. |
| 2008/0116866 | A1 | 5/2008 | Tsai |
| 2008/0224679 | A1 | 9/2008 | Sahni et al. |
| 2010/0253297 | A1 | 10/2010 | Tseng |
| 2011/0260538 | A1* | 10/2011 | Huang ............ H02J 9/062 307/64 |
| 2012/0013317 | A1 | 1/2012 | Morino |

FOREIGN PATENT DOCUMENTS

| CN | 1398031 | 2/2003 |
| CN | 1855677 | 11/2006 |
| JP | 2006236392 | 9/2006 |

OTHER PUBLICATIONS

Chinese search report issued Aug. 6, 2015 in Chinese application serial No. 2013102168125.

* cited by examiner

*Primary Examiner* — Rexford Barnie
*Assistant Examiner* — Dru Parries
(74) *Attorney, Agent, or Firm* — John R. Pessetto; Frank D. Cimino

(57) ABSTRACT

A power-gated electronic device and a method of operating the same is provided. The power-gated electronic device comprises a low drop out voltage power supply (LDO), an auxiliary power supply and at least one electronic domain having a power gate. The LDO provides a supply voltage to the at least one electronic domain which is coupled to a supply rail of the LDO via a switch, acting as a power gate. The auxiliary power supply comprises at least one current source which is coupled to the electronic domain via an auxiliary switch acting as an auxiliary power gate. The auxiliary power supply is configured to control the auxiliary switch as a function of a voltage difference between a reference voltage and the auxiliary supply voltage.

7 Claims, 3 Drawing Sheets

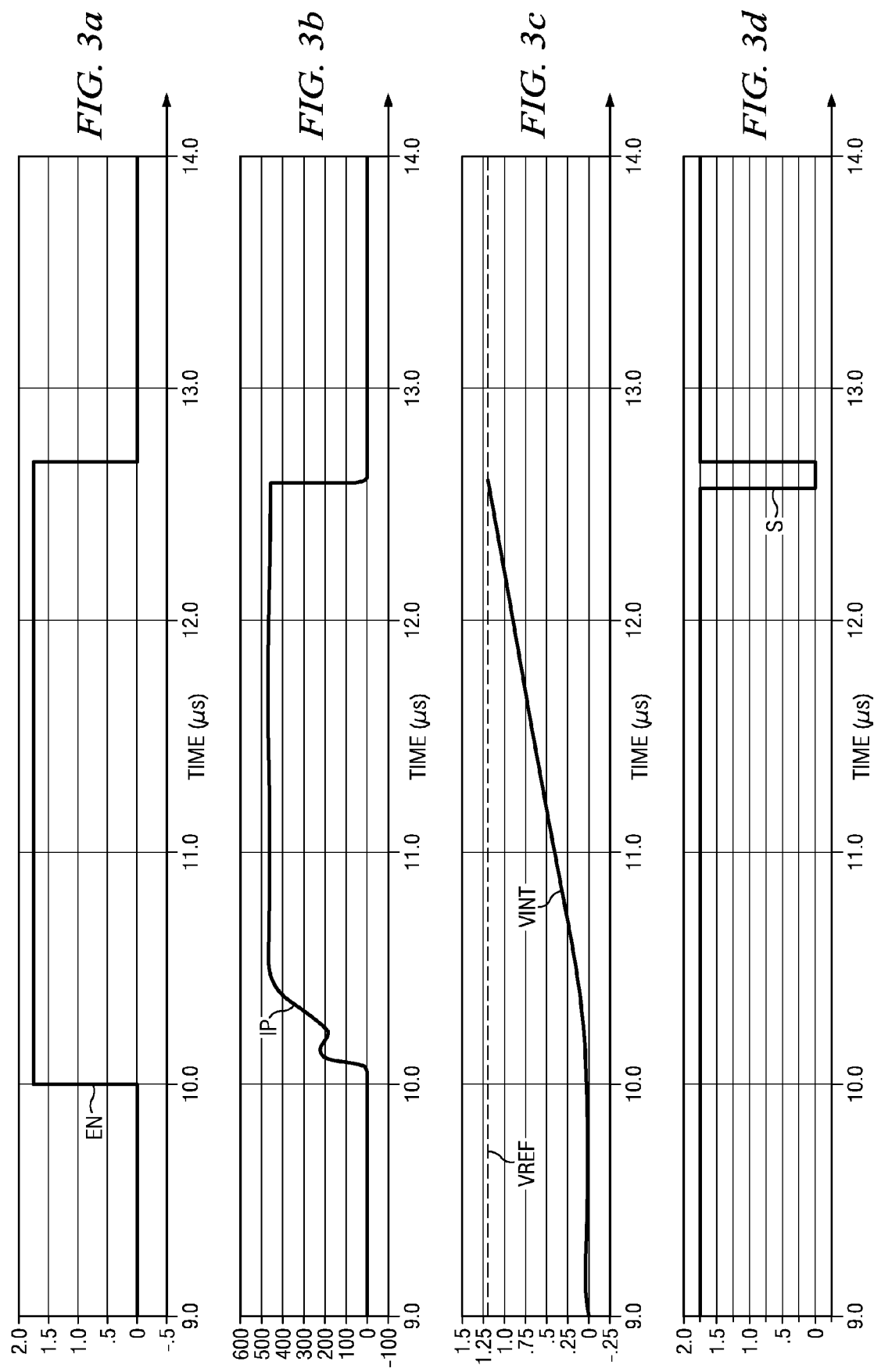

POWER-GATED ELECTRONIC DEVICE

FIELD OF THE INVENTION

The invention relates to a power-gated electronic device comprising an auxiliary power supply and at least one electronic domain having a power gate. Further, the invention relates to a method of operating this power-gated electronic device.

BACKGROUND

A parameter for modern low power digital designs, in particular for microcontroller based applications like portable or mobile electronic devices, is the current consumption in a low power mode. In low power designs, the leakage of digital gates is a contributor to the current consumption in the low power mode. For modern electronic devices which are manufactured using deep submicron process technologies, leakage currents are becoming a dominating factor. In today's low power digital designs, power gating of electronic domains (i.e. circuits) is an approach to reduce power consumption while keeping the system operable. According to the power gating approach, a digital circuit is disconnected from the power supply once it is not needed. However, in order to provide available resources and sophisticated operability of the electronic device, fast wake-up times are required for the respective electronic domain. During wake-up or power-up of the electronic domain, the local voltage level has to rise as fast as possible. However, considerable electric charge has to be transferred especially to the load capacitance of the electronic domain. This may lead to temporary high inrush currents which may cause two major problems. First, there may be a voltage drop at the power supply lines in the electronic device due to charge shifting effects. This may affect already active domains and may cause a temporary violation of the minimum supply voltage specification. Second, modern deep submicron processed electronic devices frequently use a low drop out voltage power supply (LDO). An LDO is available to deliver a limited maximum output current and may get overloaded by high inrush currents.

FIG. 1 is a simplified circuit diagram showing a detailed view of a power-gated electronic device, according to the prior art. A plurality of digital domains 10 is coupled to a power supply network which is coupled to a positive supply rail 12 supplying a positive supply voltage VDD and to a negative supply rail 14 for supplying a negative supply voltage VSS to the respective digital domains 10.

At the positive supply rail 12, the power supply network is interrupted using a plurality of switches acting as power gates 13. By selectively setting the respective power gate 13 to a conductive or non-conductive state, one or more of the digital domains 10 may be powered-up or may be disconnected from the power supply, for example in a low power mode. Each power 13 gate comprises a strong switch 16 and a weak switch 18. The strong switch 16 and the weak switch 18 offer different electric conductivity. For example, the strong 16 and weak 18 switches may be transistors having a different width. The weak switch 18 acts as a current limiting device for limiting inrush currents from the power supply network to the digital domain 10. The strong switch 16 provides a low resistance electrical connection of the digital domain 10 and minimizes losses during normal operation of the respective digital domain 10.

Upon power-on of a digital domain 10, first, the weak switch or switches 18 are closed upon communication of the signal PON. Once the supply voltage and current are settled, the strong switch 16 takes over the power supply and is set to a conductive state by the signal PGOOD. However, timing and dimensioning of the strong and weak switches 16, 18 has to be adjusted to the characteristics of the digital domain 10 and the available power supply of the electronic device and accurate timing between the signals PON and PGOOD is a rather difficult task. Further, there is a strong dependence on process variations, operating temperatures and the selected supply voltage level VDD. This will either lead to long and unacceptable power-up times of the digital domains 10 or may cause high dynamic currents that may overload the power supply, in particular an LDO.

SUMMARY

It is an object of the invention to provide an improved power-gated electronic device comprising a low drop out voltage power supply (LDO) and an improved method of operating this electronic device.

According to an aspect of the invention, a power-gated electronic device comprising a low drop out voltage power supply (LDO), an auxiliary power supply and at least one electronic domain having a power gate is provided. The LDO is coupled to a primary voltage supply node and to a supply voltage rail for providing a supply voltage to the at least one electronic domain. Each electronic domain is coupled to the supply voltage rail of the LDO via a switch acting as a power gate. A semiconductor switch is applied. This is for connecting the electronic domain to the supply voltage rail in an active mode and for disconnecting the electronic domain in a low power mode of the electronic device. The electronic device is a microcontroller having at least one low power mode. The auxiliary power supply of the power-gated electronic device comprises at least one current source which is coupled to the electronic domain via an auxiliary switch acting as an auxiliary power gate for providing an auxiliary supply voltage to the electronic domain. The auxiliary switch is a semiconductor switch. The auxiliary power supply is configured to control the auxiliary switch as a function of a voltage difference between a reference voltage and the auxiliary supply voltage.

According to an aspect of the invention, the auxiliary power supply is further configured to set the auxiliary switch to a non-conductive state if the difference between the reference voltage and the auxiliary supply voltage is below a predetermined threshold. The auxiliary power supply is coupled to the supply voltage rail of the LDO so as to receive the supply voltage of the LDO as a reference voltage. However, according to another embodiment of the invention, an external source may be applied so as to provide the reference voltage to the auxiliary power supply.

The auxiliary power supply is configured to set the switch acting as power gate for connecting the electronic domain to the supply voltage of the LDO to a conductive state if the difference between the reference voltage and the auxiliary supply voltage is below a predetermined threshold. Preferably, the threshold for setting the auxiliary switch to a non-conductive state and the threshold for setting the power gate switch to a conductive state is identical. In other words, the electronic domain is separated from the auxiliary power supply and is supplied by the LDO if the difference between the reference voltage and the auxiliary supply voltage is below a certain threshold. According to an embodiment of the invention, this action may be performed if a voltage difference between the auxiliary supply voltage and the voltage which is supplied at the supply voltage rail by the LDO is below a predetermined threshold.

According to aspects of the invention, the electronic domain is powered-up using a switchable current source, namely the auxiliary current source. Accordingly, a well defined power-on scheme may be implemented for the electronic domains of the electronic device. The wake-up process of the electronic domains is very well controllable and advantageously, it is independent of the supply voltage level of the electronic domain. Further, the implementation requires no precision elements and requires low overhead in terms of layout area.

According to another aspect of the invention, the auxiliary power supply comprises a comparator for controlling the auxiliary switch as a function of a voltage difference between the reference voltage and the auxiliary supply voltage. A first input of the comparator, preferably the non-inverting input of the comparator, is coupled to the reference voltage. A second input of the comparator, preferably the inverting input of the comparator, is coupled to the auxiliary supply voltage. The output of the comparator is coupled to the auxiliary switch so as to set the auxiliary switch to a non-conductive state if the difference between the reference voltage and the auxiliary supply voltage is below a threshold of the comparator.

According to an aspect of the invention, the reference voltage is supplied by a reference voltage source. In principle, the auxiliary power supply shall be switched off at an auxiliary supply voltage which is equal to the supply voltage of the LDO. However, each comparator shows a certain switching delay and due to this technical effect, the auxiliary supply voltage may exceed the voltage which is supplied to the respective electronic domain by the LDO. First, the auxiliary supply voltage may exceed the operating voltage of the electronic domain. Second, electric charge will get lost because subsequent to a voltage overshoot, the LDO will be forced to level down the internal voltage of the electronic domain.

In order to prevent voltage overshoots, the reference voltage which is coupled to the comparator may be set to a level which is lower than the LDO supply voltage. This will allow the comparator to start the switching operation before the auxiliary supply voltage level reaches the supply voltage level of the LDO and this will reduce the risk of voltage overshoot. If the reference voltage is set below the supply voltage of the LDO it is advantageous to select a comparator having no or very little offset.

According to another aspect of the invention, the reference voltage is the supply voltage of the LDO and accordingly, the supply voltage level of the LDO is coupled to the first input of the comparator. According to this embodiment of the invention, it is advantageous to apply a comparator having a predefined offset. For example, the comparator may comprise an asymmetrical differential pair. The design and characteristics of the comparator may be tailored to the power-up characteristic of the respective electronic domain. Accordingly, the offset of the comparator will be adjusted accordingly. In other words, the offset of the comparator defines a safety margin so as to prevent voltage overshoot in the electronic domain. The offset of the comparator will cause the comparator to start switching of the auxiliary switch below the reference voltage which is the supply voltage level of the LDO. The offset may be adjusted to the power-up characteristic of the respective electronic domain and the switching delay of the comparator so as to avoid excess of the auxiliary supply voltage over the operating voltage of the electronic domain.

According to another advantageous aspect of the invention, the electronic device comprises a plurality of power-gated electronic domains and the auxiliary power supply comprises a plurality of current sources and auxiliary switches. Each current source and each auxiliary switch of the auxiliary power supply is dedicated and coupled to a respective electronic domain. In other words, each electronic domain is supplied by an individual current source via the respective auxiliary switch of the auxiliary power supply. The auxiliary power supply in the electronic device according to this aspect of the invention is capable of providing an individual power scheme to each of the electronic domains. In other words, the auxiliary supply voltage, the auxiliary supply current and its time dependent characteristic may be tailored to the requirements of the electronic domain. According to another aspect of the invention, the current sources of the auxiliary power supply are configured to provide an individual auxiliary current to the dedicated electronic domain. In particular, the auxiliary current may be adjusted to a predetermined power-up time of the electronic domain. The power-up time and the respective inrush current for each of the electronic domains may be adjusted by the characteristics of the respective dedicated auxiliary switch, for example by selecting a semiconductor switch having a suitable width.

The comparators of the auxiliary power supply may be provided with individual reference voltages. Each reference voltage may fit in the individual power-up characteristic of the assigned electronic domain. For example, if a very fast power-up of a respective electronic domain is desired, there might be a higher risk for voltage overshoot in said electronic domain. Accordingly, the reference voltage may be selected to be sufficiently low to avoid voltage overshoot. Further, the switching delay and offset of the respective comparators may be sufficiently small. According to another aspect of the invention, if the respective comparator or comparators are coupled to the supply voltage of the LDO as a reference voltage, the individual offset of the dedicated comparators may be selected so as to fit with the power-up scheme of each individual electronic domain. For example, for electronic domains which are powered-up using a comparably high current, a comparator having a greater offset may be applied so as to avoid a voltage overshoot in the respective electronic domain.

According to another aspect of the invention, a method of operating a power-gated electronic device is provided. The power-gated electronic device comprises a low drop out voltage power supply (LDO), an auxiliary power supply and at least one electronic domain having a power gate. The LDO is coupled to a primary voltage supply node and to a supply voltage rail for providing a supply voltage to the at least one electronic domain. Each of the electronic domains is coupled to the supply voltage rail of the LDO via a switch acting as a power gate. This power gate is for connecting the electronic domain to the supply voltage rail in an active mode and for disconnecting the electronic domain in a low power mode of the electronic device. The auxiliary power supply comprises at least one current source which is coupled to the electronic domain via an auxiliary switch for providing an auxiliary supply voltage to the electronic domain. First, a power-up signal which is indicative of power-up of at least one of the electronic domains is received. In other words, the power-up signal indicates whether the respective electronic domain has to change its status from a low power mode to an active mode. In the low power mode both, the switch and the auxiliary switch are in a non-conductive state. Subsequently, the auxiliary switch is set to a conductive state so as to provide a power-up current to the dedicated electronic domain. This current is supplied by the dedicated current source of the auxiliary power supply. A voltage difference between a reference voltage and the auxiliary supply voltage is determined and the auxiliary switch is controlled as a function of the determined voltage difference.

The step of controlling the auxiliary switch comprises setting the auxiliary switch to a non-conductive state when the voltage difference is below a predetermined threshold.

According to another aspect of the invention, the switch which is for coupling the electronic domain to the power supply rail of the LDO is set to a conductive state so as to electrically connect the dedicated electronic domain to the LDO if the determined voltage difference is below a predetermined threshold. The threshold which is indicative of setting the auxiliary switch to a non-conductive state and the second threshold which is indicative of setting the switch to an active state may be identical.

Further advantages of the method according to the invention are similar to the advantages which have been already mentioned with respect to the electronic device according to aspects of the invention and are therefore not repeated.

BRIEF DESCRIPTION OF DRAWINGS

Further aspects and characteristics of the invention ensue from the following description of preferred embodiments of the invention with reference to the accompanying drawings, wherein FIG. 2 is a detailed simplified circuit diagram of a power-gated electronic device according to an embodiment of the invention and FIGS. 3a to 3d are time dependent signals illustrating an enable signal EN (FIG. 3a), a power-up current IP (FIG. 3b), an internal voltage VINT of an electronic domain (FIG. 3c) and a comparator output signal (FIG. 3d).

DETAILED DESCRIPTION OF AN EXAMPLE EMBODIMENTS

Figure 1:
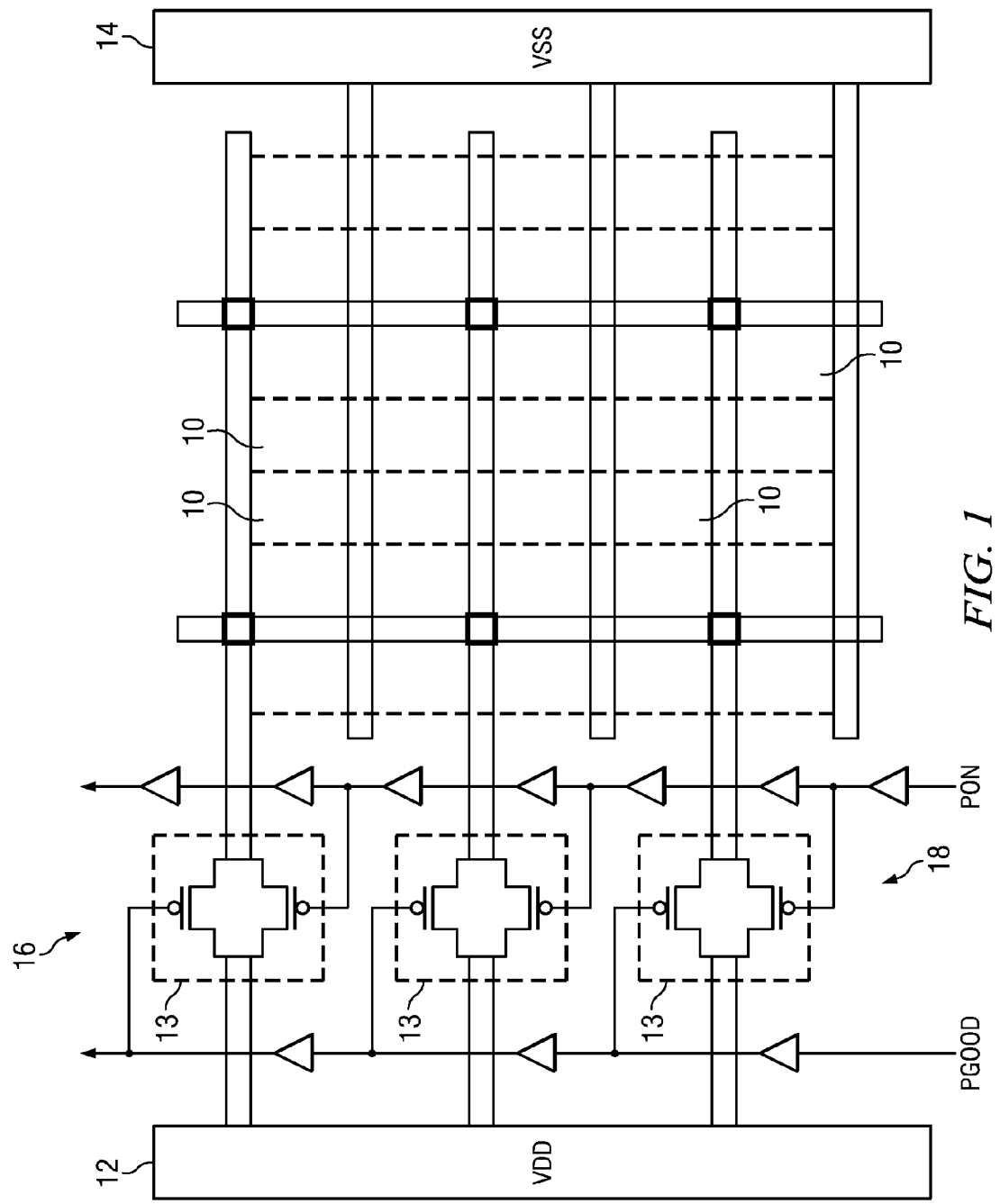
FIG. 1 is a detailed simplified circuit diagram of a power-gated electronic device according to the prior art.
Figure 2:
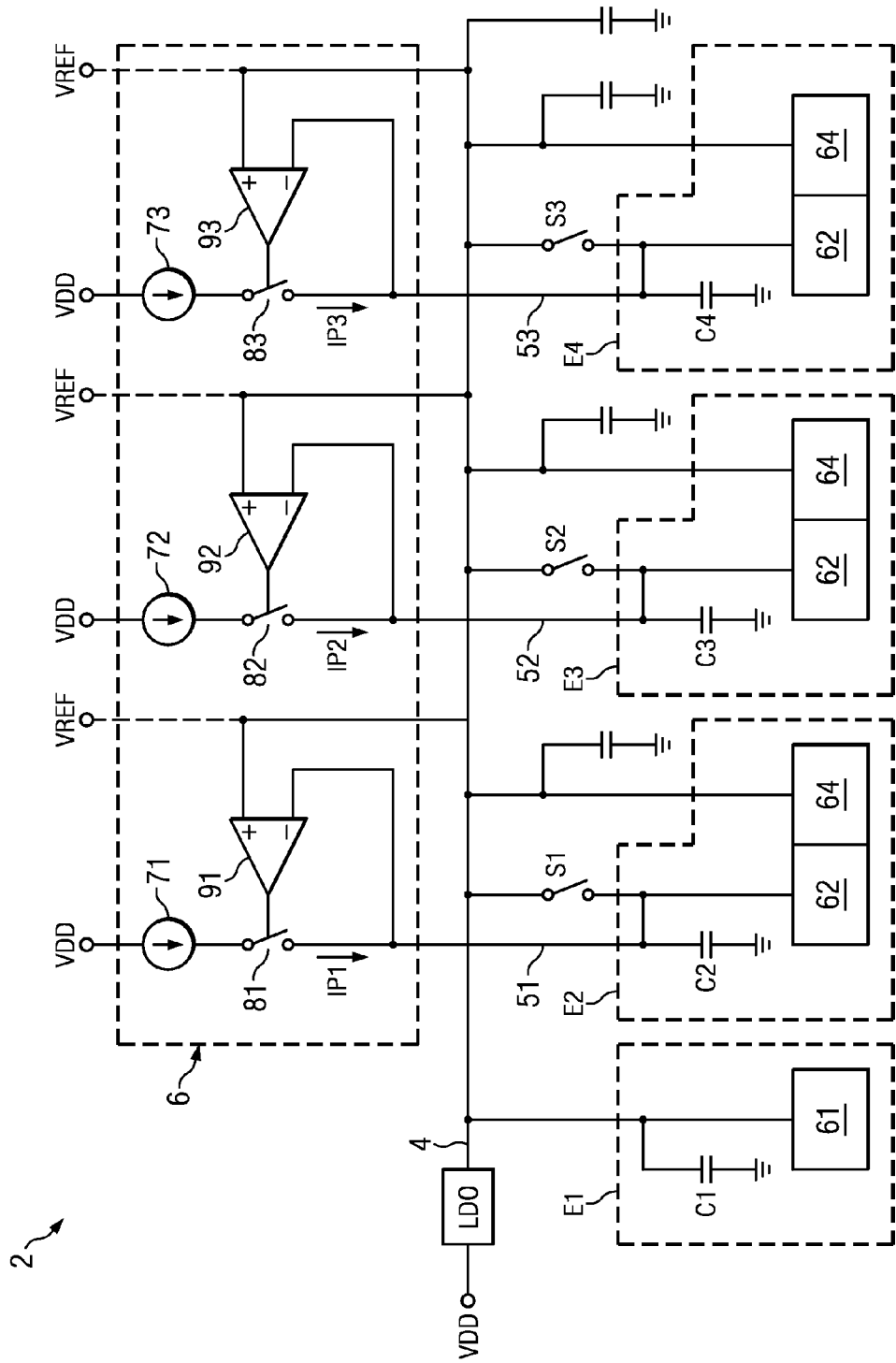

FIG. 2 is a detail of a simplified circuit diagram of a power-gated electronic device 2 according to an embodiment of the invention. The electronic device 2 comprises a plurality of electronic domains E1-E4 which are coupled to a voltage supply rail 4 of a low drop out voltage power supply LDO. For example, the electronic device 2 may be a microcontroller. By way of an example only, the electronic domains E1-E4 comprise always-on power domains 61 and electronic domains 62 which are switched off in a low power mode of the electronic device 2. Further, there may be peripheral controlled domains 64, see for example electronic domain E3 and E4. Each electronic domain E1-E4 comprises a load capacitance C1 to C4. By way of an example only, the capacitances are as follows C1=370 pF, C2=908 pF, C3=C4=362 pF.

The power-gated electronic device 2 further comprises an auxiliary power supply 6. The auxiliary power supply 6 comprises current sources 71-73 which are dedicated to supply the respective electronic domains E2-E4 via a dedicated auxiliary switches 81-83. The current sources 71-73 are coupled to a voltage supply level VDD which is also coupled to the LDO. Preferably, VDD is the voltage supply level of the microcontroller. The auxiliary power supply further comprises three comparators 91-93. For each comparator 91-93, the non-inverting input is coupled to the voltage supply rail 4 of the LDO and the inverting input is coupled to the respective auxiliary supply line 51-53 which are for coupling the auxiliary voltage and current to the electronic domains E2-E4. An output of each of the comparators 91-93 is coupled to the respective auxiliary switches 81-83. According to another embodiment of the invention, the non-inverting input of each of the comparators 91-93 is coupled to a reference voltage VREF as it is indicated by the dashed line in FIG. 2. The comparators 91-93 may be coupled to a common reference voltage VREF, however, each comparator 91-93 may be provided with an individual reference voltage if desired. According to this aspect of the invention, the level of the respective reference voltage may be tailored to the power-up scheme of the respective electronic domain E2-E4 which is coupled to the respective auxiliary switch 81-83 which is controlled by the comparator 91-93.

The electronic domains E2-E4 may be selectively powered-up by activating the respective part or module of the auxiliary power supply 6. To be more precise, not the always-on part 61 of the electronic domains E2-E4 but the remaining part 62, 64, which is powered-down in a low power mode. For example, the second electronic domain E2 may be powered-up by activation of the first current source 71 of the auxiliary power supply 6. The first auxiliary switch 81 is closed and a first power-up current IP1 is provided to the electronic domain E2 in particular for charging the load capacitance C2. The first comparator 91 senses the voltage difference at the first auxiliary supply line 51 and the voltage supply rail 4 of the LDO. If a predetermined threshold, namely the threshold of the first comparator 91 is exceeded, which means that the voltage at the auxiliary supply line 51 is sufficiently near to the voltage at the voltage supply rail 4, the first auxiliary switch 81 is set to a non-conductive state and the auxiliary power supply for the electronic domain E2 is switched off. Preferably, a first switch S1, which connects the electronic domain E2 to the voltage supply rail 4 of the LDO is set to a conductive state. This may happen on or slightly before setting the auxiliary switch 81 to a non conductive state. Now, the second electronic domain E2 is powered up and is supplied by the LDO via the voltage supply rail 4.

However, the comparator 91 has a certain switching delay which may lead to a voltage overshoot in the electronic domain E2. In general, the auxiliary switch 81 should be set to a non-conductive state exactly at that moment in time when the voltage level of the auxiliary supply voltage reaches the supply voltage level of the LDO at the supply voltage rail 4. In order to prevent voltage overshoot, the comparator 91 may have a certain offset and accordingly, the comparator 91 will start setting the auxiliary switch 81 to a non-conductive state at a voltage which is slightly lower than the voltage at the supply voltage rail 4 of the LDO. Accordingly, voltage overshoot in the electronic domain E2 may be prevented. Advantageously, the respective offset of the comparator 91 may be tailored or adjusted to the power-up characteristic of the electronic domain E2. According to another embodiment of the invention, the non-inverting input of the comparator 91 is coupled to a reference voltage VREF. In order to prevent voltage overshoot in the electronic domain E2, the reference voltage VREF may be lower than the supply voltage at the supply voltage rail 4. The voltage difference between the supply voltage of the LDO and the reference voltage VREF may take into account the switching delay of the comparator 91. Advantageously, a comparator 91 having no or very little offset may be applied. Again, the voltage level of the reference voltage VREF may be tailored to the power-up characteristic of the electronic domain E2.

The further parts or modules comprising the second power supply 72, the second auxiliary switch 82, etc. of the auxiliary power supply 6 which are for power-up of the third and fourth electronic domains E3, E4 work similar to the above outlined working principle mentioned for the second electronic domain E2. The power-up current IP1, IP2 and IP3 are not necessarily the same. These power-up currents IP1 to IP3 may be adjusted, for example by selecting a semiconductor switch having a suitable width as the auxiliary switch 81 to 83 to fulfill the requirements for power-up time of the respective electronic domains E2 to E4. Further, each reference voltage or each offset of the comparators 91, 93 may be adjusted so as to fulfill the requirements for power-up current and time of the respective electronic domains E2-E4. Each power-up of an electronic domain E2 to E4 may be controlled individually and the LDO is released from high inrush currents which typically appear on power-up of an electronic domain E2-E4.

FIGS. 3a to 3d illustrate the timing of signals in the auxiliary power supply 6 of an electronic device 2 according to an embodiment of the invention. In FIG. 3a, there is an enable signal EN which is set from low to high at t=10 µs. Accordingly, the respective part or module of the auxiliary power supply 6 which is dedicated to an electronic domain E2-E4 is activated and a power on current IP (see FIG. 3b) starts flowing and increases from this point in time. A maximum power-up current is adjusted to a value between 400 µA and 500 µA and is limited for example by the conductivity of the respective auxiliary switch 81 to 83 to this suitable level. Due to power-up of the respective electronic domain E2-E4, a domain core voltage VINT of the respective electronic domain E2-E4 increases almost linearly and approaches the reference voltage VREF (see FIG. 3c). The reference voltage VREF may be the voltage at the power supply line 4 of the LDO or an external reference voltage. If the voltage difference between the domain core voltage VINT which is almost equal to the voltage at the auxiliary supply line 51-53 and may be sensed at the auxiliary supply line 51-53, and the reference voltage VREF is below a certain threshold, the auxiliary switch 81 to 83 is opened. This is due to the output signal S of the comparator 91 to 93 showing a short drop off signal (FIG. 3d). At the same time, the switch S1-S3 may be set to a conductive state, power is supplied by the voltage supply rail of the LDO and the power up cycle is finished.

Although the invention has been described hereinabove with reference to specific embodiments, it is not limited to these embodiments and no doubt further alternatives will occur to the skilled person that lie within the scope of the invention as claimed.

The invention claimed is:

1. A power-gated electronic device comprising:
   a low drop out voltage power supply (LDO);
   an auxiliary power supply; and
   at least one electronic domain having a power gate;
   wherein the LDO is coupled to a primary voltage supply node and to a supply voltage rail for providing a supply voltage to the at least one electronic domain, wherein each electronic domain is coupled to the supply voltage rail of the LDO via a switch acting as a power gate for connecting the electronic domain to the supply voltage rail in an active mode and for disconnecting the electronic domain in a low power mode of the electronic device;
   wherein the auxiliary power supply comprises at least one current source which is coupled to the electronic domain via an auxiliary switch acting as an auxiliary power gate for providing an auxiliary supply voltage to the electronic domain; and
   wherein the auxiliary power supply is configured to control the auxiliary switch as a function of a voltage difference between a reference voltage and the auxiliary supply voltage.

2. The electronic device according to claim 1 wherein the auxiliary power supply is further configured to set the auxiliary switch to a non-conductive state if the difference between the reference voltage and the auxiliary supply voltage is below a threshold.

3. The electronic device according to claim 2 wherein the auxiliary power supply is further configured to set the switch acting as a power gate for connecting the electronic domain to the supply voltage of the LDO to a conductive state if the difference between the reference voltage and the auxiliary supply voltage is below a threshold.

4. The electronic device according to claim 1 wherein the auxiliary power supply further comprises a comparator for controlling the auxiliary switch as a function of the voltage difference between the reference voltage and the auxiliary supply voltage, wherein a first input of the comparator is coupled to the reference voltage, a second input of the comparator is coupled to the auxiliary supply voltage and the output of the comparator is coupled to the auxiliary switch so as to set the auxiliary switch to a non-conductive state if the voltage difference between the reference voltage and the auxiliary supply voltage is below a threshold of the comparator.

5. The electronic device according to claim 1 wherein the auxiliary power supply is coupled to the supply voltage rail of the LDO to receive the supply voltage of the LDO as the reference voltage.

6. A power-gated electronic device comprising:
   a low drop out voltage power supply (LDO);
   an auxiliary power supply; and
   a plurality of power-gated electronic domains;
   wherein the LDO is coupled to a primary voltage supply node and to a supply voltage rail for providing a supply voltage to the plurality of power-gated electronic domains, wherein each electronic domain in the plurality of power-gated electronic domains is coupled to the supply voltage rail of the LDO via a switch acting as a power gate for connecting the electronic domain to the supply voltage rail in an active mode and for disconnecting the electronic domain in a low power mode of the electronic device;
   wherein auxiliary power supply comprises a plurality of current sources and auxiliary switches, wherein each auxiliary current source and each auxiliary switch is dedicated and coupled to a respective electronic domain in the plurality of power-gated electronic domains, wherein the current sources of the auxiliary power supply are configured to provide an individual auxiliary supply voltage and/or current to each electronic domain in the plurality of power-gated electronic domains;
   wherein the auxiliary power supply is configured to control the auxiliary switches as a function of a voltage difference between a reference voltage and the auxiliary supply voltage.

7. The electronic device according to claim 6, wherein each current source of the auxiliary power supply is configured to provide an auxiliary current to the dedicated electronic domain which is adjusted to a predetermined power-up time of said electronic domain.

\* \* \* \* \*